United States Patent [19]

Lindberg et al.

[11] 4,100,234
[45] Jul. 11, 1978

[54] AIR METERING APPARATUS

[75] Inventors: Allen W. Lindberg, Kirkwood; Thomas R. Gantzert, Florissant, both of Mo.

[73] Assignee: ACF Industries, Inc., New York, N.Y.

[21] Appl. No.: 768,007

[22] Filed: Feb. 11, 1977

[51] Int. Cl.² .............................................. F02M 7/24
[52] U.S. Cl. ........................... 261/121 B; 123/119 EC; 137/881; 251/141; 261/DIG. 74
[58] Field of Search .................. 261/121 B, DIG. 74; 123/119 EC; 137/612.1; 251/141

[56] References Cited

U.S. PATENT DOCUMENTS

| | | | |
|---|---|---|---|
| 1,112,631 | 10/1914 | Longtin | 137/612.1 |
| 2,904,070 | 9/1959 | Lynott | 137/612.1 |
| 3,318,332 | 5/1967 | Lansky et al. | 251/141 |
| 3,785,389 | 1/1974 | Friedland et al. | 137/608 |
| 3,906,910 | 9/1975 | Szlaga, Jr. | 261/121 B |
| 3,921,612 | 11/1975 | Aono | 137/121 B |
| 3,942,493 | 3/1976 | Linder et al. | 261/121 B |
| 3,987,131 | 10/1976 | Hisatomi et al. | 261/121 B |
| 4,023,357 | 5/1977 | Masaki | 137/121 B |

FOREIGN PATENT DOCUMENTS 2,607,232  9/1976  Fed. Rep. of Germany ... 261/DIG. 67

Primary Examiner—Tim R. Miles

[57] ABSTRACT

Apparatus for metering the quantity of air supplied to at least one fuel system in a carburetor for an internal combustion engine. The carburetor has at least one air passageway therein through which air is drawn into the engine. Fuel is supplied to the carburetor through the fuel system and mixed with air as it passes through the carburetor and the carburetor has a conduit through which air is introduced into the fuel system. The apparatus comprises a chamber having an air inlet in communication with the air passageway of the carburetor and a plurality of air outlets in communication with the conduit. An electrically operated valve selectively opens and closes each air outlet and electrical current is selectively supplied to each valve whereby one or more of the air outlets may be opened thereby to supply air from the passageway to the conduit and to control the quantity of air flowing to the fuel system.

11 Claims, 4 Drawing Figures

AIR METERING APPARATUS

BACKGROUND OF THE INVENTION

This invention relates to air metering apparatus and more particularly to such apparatus for use with means for controlling the ratio of air to fuel in a mixture to be combusted in an internal combustion engine.

The control of emissions from internal combustion engines and particularly automobile engines has become a major environmental concern. Various federal and state regulatory agencies have promulgated emission standards for certain substances found in the combustion products entering the atmosphere through an engine's exhaust, the most important of these substances being hydrocarbons, carbon monoxide and oxides of nitrogen. To meet emission control standards, various pollution control devices such as catalytic converters and thermal reactors have been developed for use with automobile engines to reduce the quantities of unwanted substances emitted into the atmosphere to within prescribed limits.

It has been found that most efficient removal of unwanted substances by pollution control devices is achieved when an engine is operated within a narrow range of air-fuel ratio values for an air-fuel mixture combusted in an engine. Consequently, numerous systems have been developed which attempt to maintain the air-fuel ratio of a mixture to be combusted in an engine within this value range. Examples of systems of this type are disclosed in U.S. Pat. Nos. 3,939,654, 3,946,198, 3,949,551 and 3,963,009. While the systems disclosed in these patents do tend to keep the air-fuel ratio for a mixture to be combusted within the value range where maximum efficiency in removal is obtained, this is usually accomplished only by constantly adjusting the air-fuel ratio. Further, overadjustments frequently occur which then require additional corrections and the systems respond to transitory changes in an engine's operating characteristic to make adjustments when none are actually needed.

SUMMARY OF THE INVENTION

Among the several objects of the present invention may be noted the provision of apparatus for controlling the quantity of air supplied to a fuel system in a carburetor for an internal combustion engine; the provision of such apparatus which is useful in controlling the air-fuel ratio of a mixture to be combusted in the engine; the provision of such apparatus which simultaneously meters the quantity of air flowing to a second fuel system in the carburetor; the provision of such apparatus which reliably and accurately meters the quantity of air flowing to both fuel systems; and the provision of such apparatus which is economical to manufacture and easy to install and operate.

Briefly, apparatus of the present invention meters the quantity of air supplied to at least one fuel system in a carburetor for an internal combustion engine. The carburetor has at least one air passageway therein through which air is drawn into the engine. Fuel from a source thereof is supplied to the carburetor through the fuel system and mixed with air as it passes through the carburetor and the carburetor has a conduit through which air is introduced into the fuel system. The apparatus comprises a chamber having an air inlet in communication with the air passageway of the carburetor and a plurality of air outlets in communication with the conduit. An electrically operated valve selectively opens and closes each air outlet and means are provided for selectively supplying electrical current to each valve whereby one or more of the air outlets may be opened thereby to supply air from the passageway to the conduit and to control the quantity of air flowing to the fuel system. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
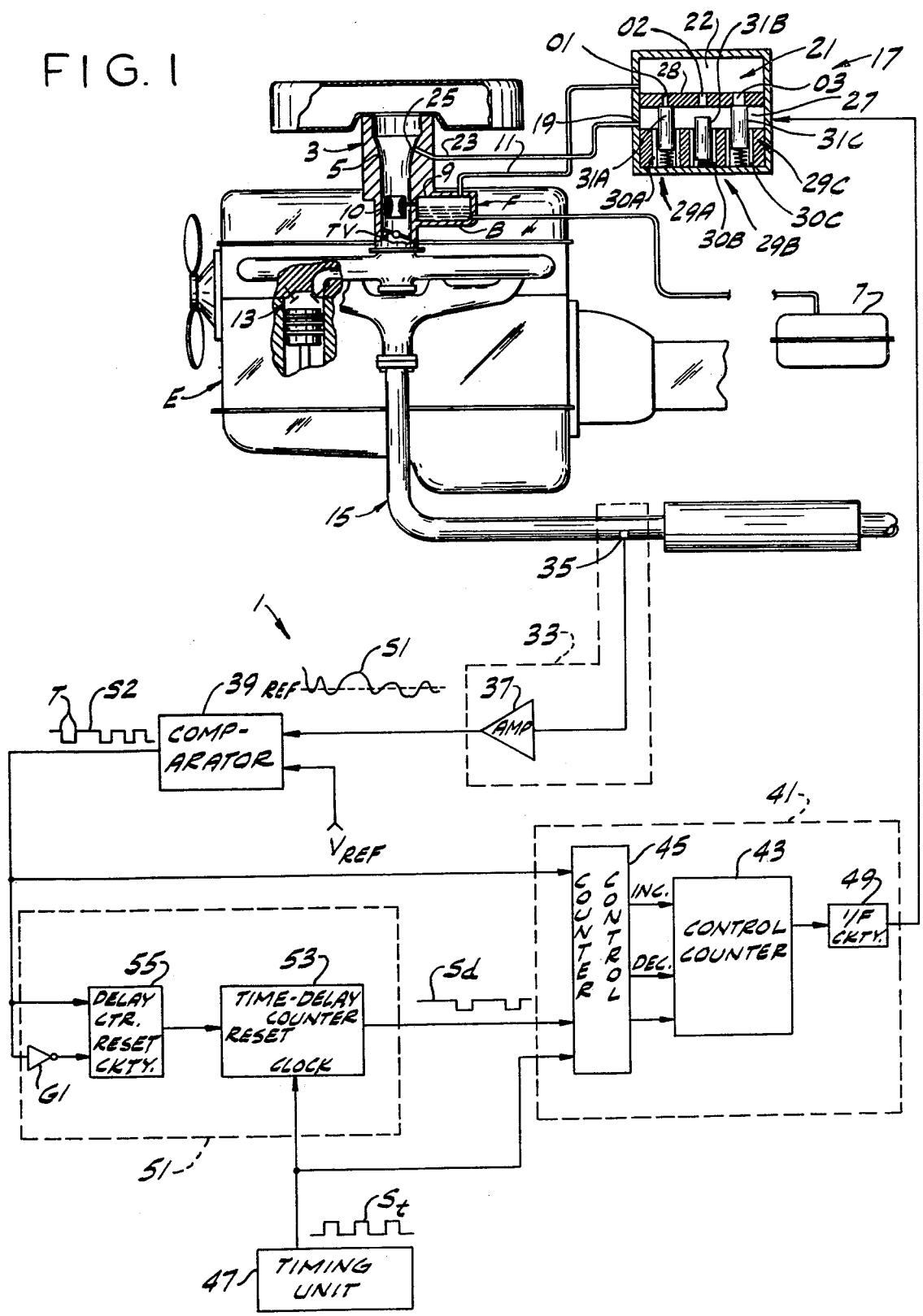
FIG. 1 is a block diagram of apparatus for controlling the air-fuel ratio in an internal combustion engine which includes air metering apparatus of the present invention.

Referring now to the drawings, apparatus for controlling the air-fuel ratio in an internal combustion engine E to substantially maintain the ratio at a predetermined value while the engine is operating under various load conditions is indicated generally at 1. Engine E has a carburetor 3 with an air passageway 5 through which air is drawn into the engine and fuel F from a source 7 is supplied to the carburetor through at least one fuel system 9 and mixed with air passing through the carburetor. The carburetor also has a throttle valve TV to control the flow rate of air through the carburetor and a venturi 10 by which a pressure differential is created so that fuel F is drawn through fuel system 9 and mixed with air to produce an air-fuel mixture, all as is well known in the art. Carburetor 3 further has a conduit 11 through which air is introduced into fuel system 9 as will be discussed. Engine E further has a chamber 13 for combustion of the resulting air-fuel mixture and an exhaust system 15 for exhausting the products of combustion.

An air metering unit of the present invention, generally indicated 17, meters the quantity of air introduced into fuel system 9 through conduit 11 to control the air-fuel ratio of the mixture. The unit has an air inlet 19 in communication with air passageway 5 and a plurality of air outlets O, three air outlets O1-O3, for example, being shown in FIG. 1. These air outlets comprise a set, generally indicated 21, and each air outlet communicates with conduit 11 through an outlet chamber 22. A portion of the air entering carburetor 3 through passageway 5 enters a conduit 23 via an opening 25 in the side of the passageway and enters air metering unit 17 through inlet 19. This air enters an inlet chamber 27 in the metering unit and exits the chamber through outlets O and outlet chamber 22. Outlet chamber 22 is separated from inlet chamber 27 by a partition 28 and the air outlets are formed in this partition. Each air outlet in set 21 is a different size, the size of the outlets increasing from a small size (the size of outlet O1) to a large size (the size of outlet O3) in a predetermined progressive manner. More specifically, set 21 is comprised of $n$ air outlets ($n$ in this example being three) and the size of any air outlet is determined by the formula $Ox = O_1.2^{x-1}$ where Ox is the outlet whose size is to be determined, $O_1$ is the size of the smallest outlet in the set and $x$ is a positive integer having a value between 1 and $n$. Using this formula, outlet O2 is determined to be twice the size of outlet O1 and outlet O3 four times the size of outlet O1. An electrically operated valve 29 selectively opens and closes each air outlet, valve 29A opening and closing outlet O1, valve 29B outlet O2 and valve 29C outlet O3. Each valve is a solenoid valve and has a winding 30A-30C respectively and a valve member 31A-31C respectively biased toward a closed position. Current is selectively supplied to each valve 29, as will be discussed, and when winding 30 of a valve is energized, valve member 31 moves to an open position. Depending upon the number of valves to which current is supplied, one or more of the air outlets in set 21 may be opened thereby to supply air from passageway 5 to conduit 11 and to control the quantity of air flowing to fuel system 9. With more air flowing through conduit 11 and entering fuel system 9 there is a decrease in the flow rate of fuel through the system so that less fuel is mixed with air and the air-fuel ratio of the resulting mixture increases (i.e., the mixture becomes leaner). When less air enters fuel system 9 through conduit 11 the flow rate of fuel increases, more fuel is mixed with the air and the air-fuel ratio decreases (i.e., the mixture becomes richer). It will be understood that air metering unit 17 may be formed as part of carburetor 3 or may be a separate unit installed at a convenient location with respect to engine E and the carburetor.

Among the products of combustion exhausted through system 21 is free oxygen and the amount of this oxygen is a function of the air-fuel ratio of the mixture combusted in chamber 13, i.e., the richer the mixture the less free oxygen is in the combustion products and the leaner the mixture the more free oxygen is present. The presence of oxygen in the products of combustion is sensed by an oxygen sensor 33 from which is supplied a first electrical signal S1 representative of the oxygen content. The dashed line REF shown in FIG. 1 represents the oxygen content in the products of combustion at the predetermined air-fuel ratio value. Sensor 33 includes a detector 35 positioned in the exhaust system and responsive to the oxygen content to generate a voltage whose amplitude is a function of the oxygen content and inversely related thereto, i.e., the more oxygen present in the exhaust system (the leaner the mixture) the lower is the amplitude of the generated voltage and vice versa. The detector may be a zirconia type detector or any other suitable oxygen detector. The voltage generated by detector 35 is amplified by an amplifier 37 to produce first electrical signal S1 which is an analog signal.

A comparator 39, which is a voltage comparator, compares first electrical signal S1 (the amplitude of the signal) with a predetermined reference level V ref. (a voltage level) which is a function of the predetermined air-fuel ratio value at which engine E is to operate to produce a second electrical signal S2 having first and second signal elements. A first signal element of the second electrical signal (a logic high) is produced when the air-fuel ratio of the mixture is greater than the predetermined level (the amplitude of signal S1 is less than the reference voltage level) and a second signal element (a logic low) is produced when the ratio is less than the value (the amplitude of signal S1 is greater than the reference voltage level). A transition T from one signal element to the other occurs whenever the amplitude of signal S1 changes from greater to less than the reference voltage amplitude and vice versa.

A controller 41 is responsive to second electrical signal S2 to selectively supply current to solenoid valves 29 of air metering unit 17. As a result, one or more of the air outlets in set 21 may be opened and the quantity of air introduced into conduit 11 passageway 5 is controlled. The controller includes a reversible accumulating control counter 43 and a counter control 45. The counter control is responsive to first and second signal elements of the second electrical signal to increment and decrement the contents of the control counter. The contents of the control counter are incremented when less air is to be introduced into conduit 11 and the air-fuel mixture made richer and decremented when more air is to be introduced into the conduit and the mixture made leaner. A timing unit 47 generates a timing signal St having a plurality of signal elements which are supplied to a count input of control counter 43, through counter control 45, to increment and decrement its contents. The contents of the control counter are incremented by elements of the timing signal when a first signal element of the second electrical signal is supplied to counter control 45 and decremented by timing signal elements when a second signal element of the second electrical signal is supplied to the counter control. Controller 41 further includes an interface circuit 49 to which control counter 43 supplies a digital signal representative of the value of its contents. Interface 49 is responsive to the digital signal to supply current to the solenoid valves in air metering unit 17. Controller 41 is responsive to the second electrical signal to produce a change in the digital signal whenever the second electrical signal has a transition T from one signal element to the other, i.e., the contents of control counter 43 are incremented instead of decremented or vice versa. This results in a change in the digital signal supplied to interface 49 and in the solenoid valves to which current is supplied by the interface circuitry. As a result, some of the air outlets in set 21 which were previously closed are now opened and vice versa and the quantity of air introduced into conduit 11 is changed by an amount necessary to substantially maintain the air-fuel ratio at the predetermined value. Thus, a change in the control signal from controller 41 modulates the quantity of air introduced into fuel system 9. The air-fuel ratio of the mixture combusted in chamber 13 is thus varied and is driven toward the desired value.

Besides being supplied to controller 41, the second electrical signal is sampled by a sampler 51. This sampling occurs over a predetermined time interval starting when a signal element of the second electrical signal is produced and its purpose is to determine whether a transition between signal elements occurs within the time interval. Elements of timing signal St are supplied to sampler 51 which includes a time-delay counter 53 responsive to the timing signal elements for counting from zero to a preselected value which may, for example, be two and for inhibiting counter control 45 from incrementing or decrementing the contents of control counter 43 until the preselected value is reached. Delay counter 53 supplies first and second signal element of a delay signal Sd to counter control 45. A first signal element of the delay signal is supplied to counter control 45 whenever the value of the contents of delay counter 53 is less than the preselected value and a second signal element of the delay signal is supplied to the counter control when the preselected count value is reached. When a first signal element is supplied to counter control 45, the counter control is inhibited for passing timing signal elements to control counter 43, as will be discussed, and the contents of the counter are unchanged. Only when a second signal element of the delay signal is supplied to counter control 45 is the contents of counter 43 incremented or decremented. Further, sampler 51 includes a delay counter reset circuit 55 responsive to each transition between signal elements of the second electrical signal to reset the value of the delay counter contents to zero. Consequently, if a transition between signal elements of the second electrical signal occurs within the predetermined time interval, i.e., before the count value of counter 53 reaches two, counter control 45 remains inhibited because it is still supplied with a first signal element of the delay signal and no change is produced in the contents of control counter 43 or in the solenoid valves of air metering unit 17 to which current is supplied. Thus, controller 41 is responsive to sampler 51 to produce a change in the control signal only if no transition between signal elements occurs within the predetermined time interval. If a transition does occur within the interval, no change in the control signal is produced and the quantity of air introduced into conduit 11 remains the same.

The importance of this sampling feature is that it prevents continuous adjustment of the air-fuel ratio of the combusted mixture. Thus, for example, momentary or transient changes which occur do not result in an adjustment, when none is actually needed, and eliminates the need for a second adjustment which would otherwise result when the transient change is over. By providing for a "second look" at the air-fuel ratio relative to the predetermined value before making an adjustment, the apparatus responds only to long term changes and makes an adjustment to the air-fuel ratio only when one is actually needed to return the ratio value to the point where the most efficient removal of substances from the exhaust products is accomplished as, for example, by a catalytic converter 56 in the engine's exhaust system.

Figure 3:
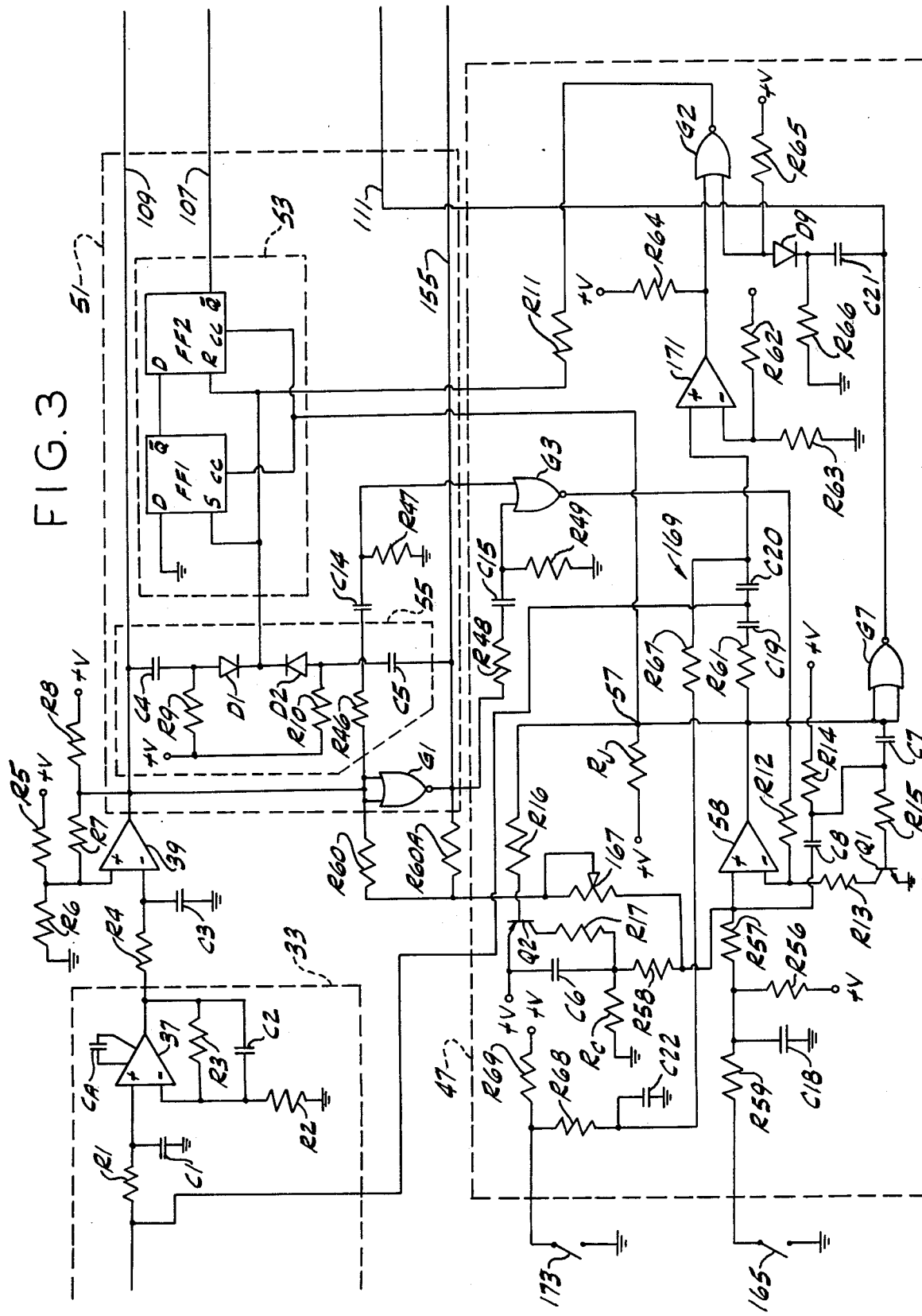
FIG. 3 is a schematic circuit diagram of a portion of the circuitry employed with air metering apparatus of the present invention.

Referring to FIG. 3, the voltage developed by detector 35 is supplied through a filter network comprised of a resistor R1 and a capacitor C1 and applied to one input (the non-inverting input) of amplifier 37 which is an operational amplifier and includes a capacitor CA. Preferably, the amplifier has a field-effect transistor (FET) input circuit which imposes a substantially zero current load on the detector. The amplifier gain is determined by a pair of resistors R2 and R3 and a feedback capacitor C2 and is, for example, five. From the output of amplifier 37 is supplied first electrical signal S1 which is applied to one input of comparator 39, the inverting input of an operational amplifier, through a filter network comprised of a resistor R4 and a capacitor C3. The comparator has a second input to which is applied the reference level V ref. This level is a voltage developed across a divider network comprised of a pair of resistors R5 and R6 and may, for example, represent the air-fuel ratio of the mixture at the stoichiometric point. The comparator circuitry further includes a feedback resistor R7 and a pull-up resistor R8. First and second signal element of the second electrical signal are supplied from the output of comparator 39. Because the first electrical signal is supplied to the inverting input of the comparator, a first signal element of the second electrical signal, a logic high, is produced when the amplitude of the first electrical signal is less than the reference voltage amplitude and a second signal element, a logic low, is produced when the amplitude of the first electrical signal exceeds the reference voltage amplitude.

Sampler 51, as noted, includes delay counter 53 and counter reset circuitry 55. Counter 53 is a two-stage binary counter comprised of a pair of flip-flops FF1 and FF2 respectively. The data input to flip-flop FF1 is grounded, while the data input of flip-flop FF2 is connected to the $\overline{Q}$ output of flip-flop FF1. Elements of delay signal Sd are supplied to counter control 45 from the $\overline{Q}$ output of flip-flop FF2. Counter reset circuitry 55 includes a pair of diodes D1 and D2 and a pair of R-C networks respectively comprised of a resistor R9 and a capacitor C4 and a resistor R10 and a capacitor C5. One side of capacitor C4 is connected to the output of comparator 39, while one side of capacitor C5 is connected to the output of a NOR gate G1 which serves to invert the second electrical signal supplied by comparator 39. The cathodes of diodes D1 and D2 are commonly connected and are tied to the set input of flip-flop FF1 and the reset input of flip-flop FF2. Further, the cathodes are connected through a resistor R11 to the output of a NOR gate G2, the function of which will be discussed. The resistance values of resistors R9 and R10 are each approximately one hundred times larger than that of resistor R11.

With the logic output of gate G2 low, each transition between signal elements of the second electrical signal results in a positive pulse being applied to the set input of flip-flop FF1 and the reset input of flip-flop FF2. An element of timing signal St supplied to the clock input of each flip-flop at this time results in the $\overline{Q}$ output of flip-flop FF1 going low and the $\overline{Q}$ output of flip-flop FF2 going high. This is the reset state of counter 53. When the next element of the timing signal is supplied to the clock inputs of the flip-flops, the $\overline{Q}$ output of flip-flop FF1 goes from low to high because the data input to the flip-flop is low. The $\overline{Q}$ output of flip-flop FF2 however remains high. When the next or second signal element of the timing signal is supplied to the clock inputs of the flip-flops, the $\overline{Q}$ output of flip-flop FF2 goes low because the data input to the flip-flop is now high. The $\overline{Q}$ output of flip-flop FF1 however remains high. Subsequent signal elements of the timing signal supplied to the clock input of the flip-flops do not effect a change in the $\overline{Q}$ output of either flip-flop unless the flip-flops are reset, in which instance the preceding sequence of events is repeated. A first signal element of the delay signal corresponds to the logic high at the $\overline{Q}$ output of flip-flop FF2 prior to a second timing signal element being supplied to the clock input of the flip-flops after delay counter 53 is reset. A second signal element of the delay signal corresponds to the logic low present at the $\overline{Q}$ output of flip-flop FF2 from the time the second timing signal element is supplied to the flip-flops, after the counter is reset, until the counter is again reset.

Elements of the timing signal generated by timing unit 47 and supplied to sampler 51 are developed at a junction point 57 within the timing unit. The timing unit includes a timing capacitor C6 and if this capacitor is assumed to be discharged, a voltage corresponding to a logic high is present at the junction and is supplied through a resistor Rj. Capacitor C6 is negatively charged through a resistor Rc and the charge level of the capacitor is applied to one input of a comparator 58 which is the noninverting input of an operational amplifier. A reference voltage corresponding to a predetermined charge level of capacitor C6 is applied to a second input of the comparator (the inverting input of the amplifier), this voltage being developed across a divider network comprised of a pair of resistors R12 and R13 respectively when an NPN transistor Q1 is conducting and the logic output of a NOR gate G3 is high. Base voltage for transistor Q1 is supplied through a pair of resistors R14 and R15 respectively and with capacitor C6 discharged, the transistor conducts. Connected between capacitor C6 and electrical ground is a PNP transistor Q2 which is biased off when a logic high is present at junction 57. The output of comparator 58 is connected to the base of transistor Q2 through a resistor R16.

With capacitor C6 discharged, a logic high is supplied from the output of comparator 58 because the voltage level at the non-inverting input to the comparator, which corresponds to the capacitor charge level, exceeds the reference voltage. As capacitor C6 charges, this voltage level decreases and eventually falls below the reference level. When this occurs, the logic output of comparator 58 goes low driving junction 57 low. Transistor Q1 turns off because of coupling through a capacitor C7 to the low comparator output while transistor Q2 is biased into conduction. With transistor Q2 on, capacitor C6 discharges through a resistor R17. Positive feedback to the non-inverting input of comparator 58 through a capacitor C8 and capacitor C7, forces a complete high to low transition in the comparator output signal. This logic low is maintained while capacitor C7 charges and transistor Q1 is switched back into conduction. Capacitor C6 fully discharges during this period and when transistor Q1 again conducts the reference level is again applied to the inverting input of comparator 58 causing a transition at the comparator output from a logic low to high. This takes transistor Q2 out of conduction and capacitor C6 starts charging again. At junction 57, a negative going pulse or signal element of the timing signal has been produced and supplied to the clock inputs of flip-flops FF1 and FF2.

Figure 2:
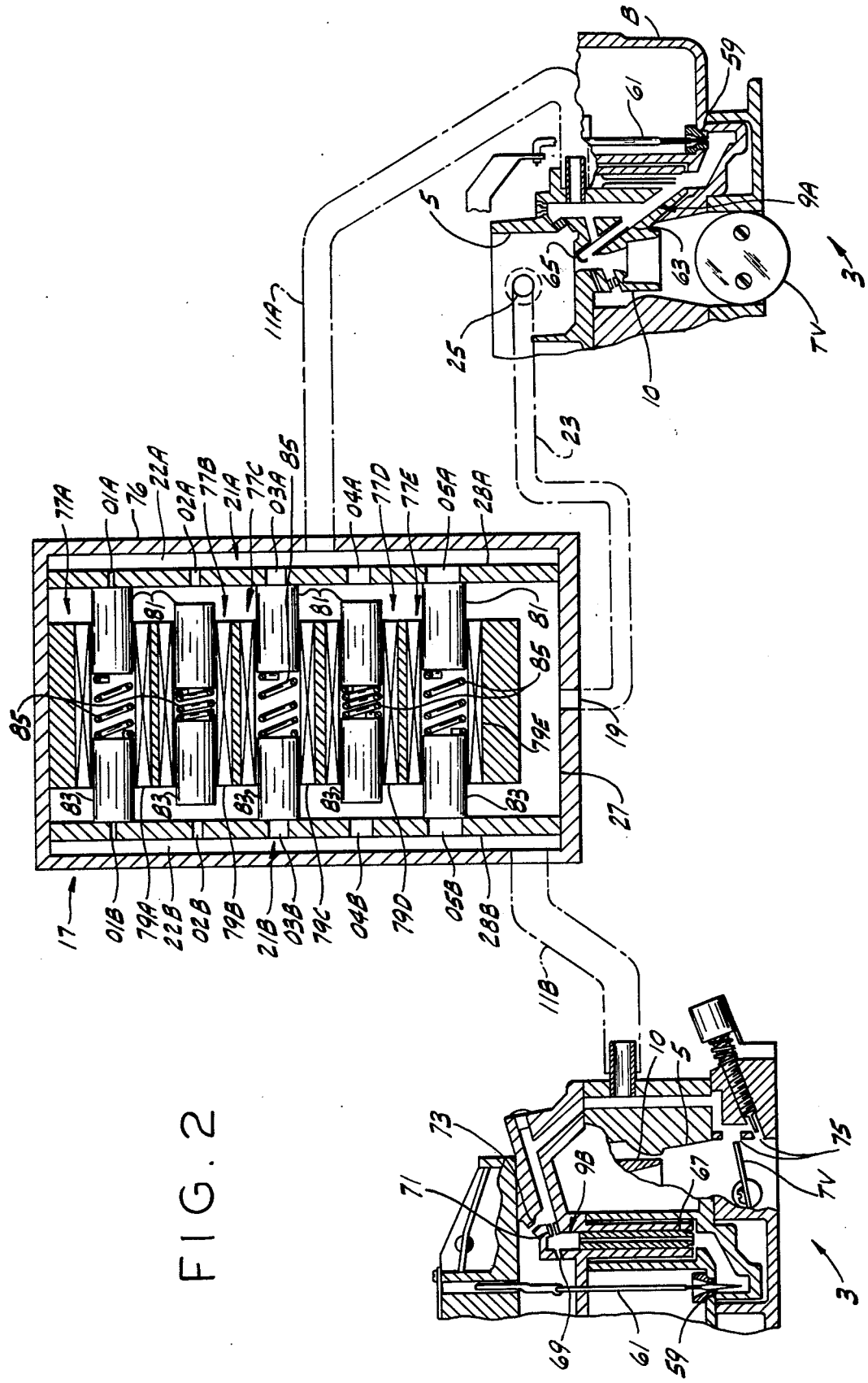
FIG. 2 is a view illustrating in section the low and high speed circuits of a carburetor and an air metering unit of apparatus of the present invention.
Figure 4:
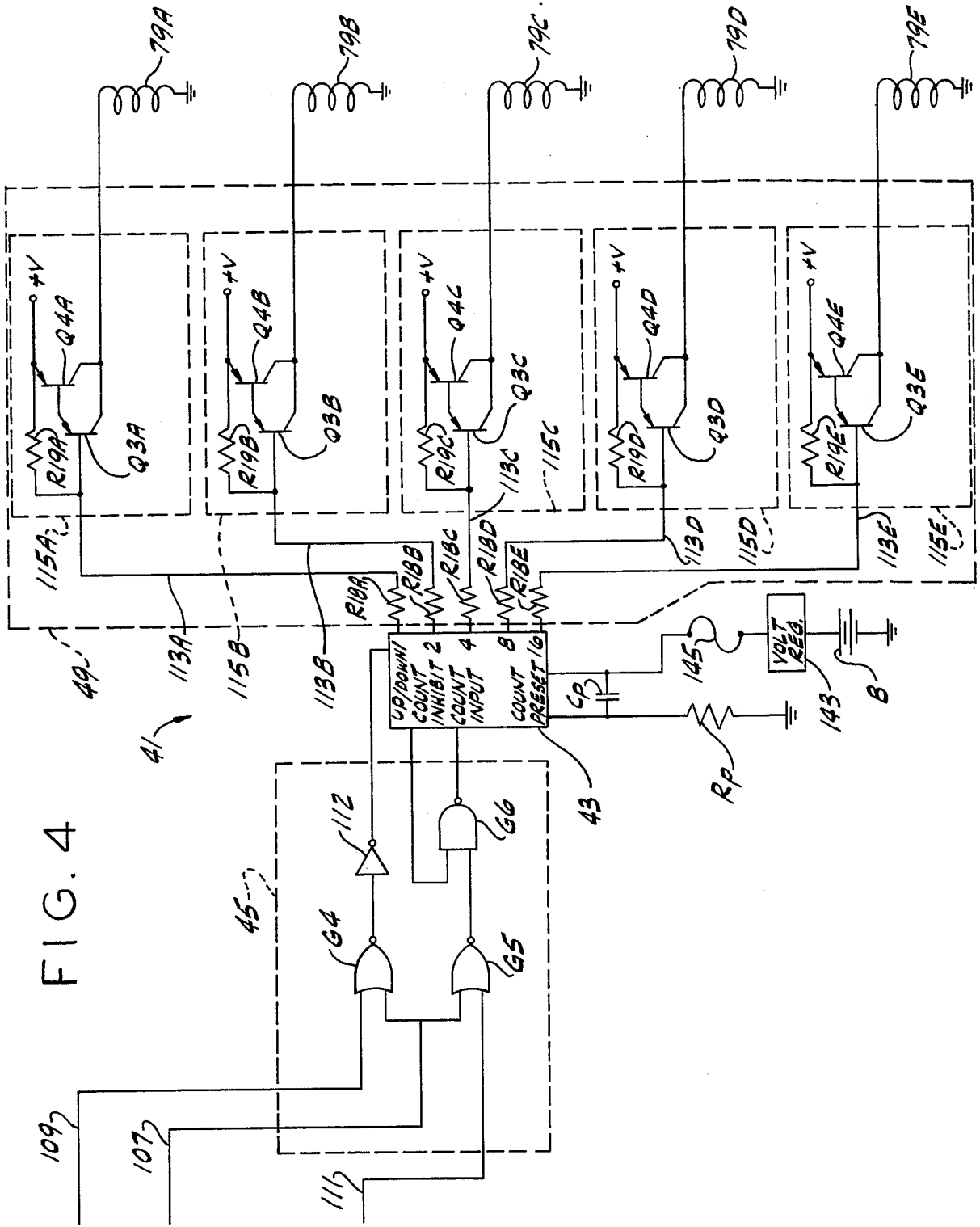
FIG. 4 is a schematic circuit diagram of controller circuitry for use with air metering apparatus of the present invention.

Referring now to FIGS. 2 and 4, air metering unit 17 is shown (FIG. 2) together with controller 41 circuitry (FIG. 4) used with the unit. As shown in FIG. 2, carburetor 3 contains two fuel supply systems, a high-speed (main) system 9A and a low-speed (idle) system 9B. In high-speed system 9A, fuel flows from a bowl B through a metering jet 59 and the flow rate of fuel is controlled by a tapered metering rod 61 positioned in the jet by throttle TV. Fuel metered through jet 59 enters a well 63 from which it is drawn into passageway 5 through a nozzle 65. In low-speed system 9B, fuel leaving jet 59 enters the system through a low-speed jet 67. The fuel is then mixed with air entering the system at an air bleed 69 and the mixture is accelerated through a restriction 71 and mixed with more bleed air entering the system through an air bleed 73. The resultant mixture is discharged into passageway 5 through idel ports 75 which are located downstream from closed throttle TV.

For a carburetor 3 as shown in FIG. 2, air metering unit 17 has two sets, 21A and 21B respectively, of air outlets O, one for each fuel system and each set is, for example, comprised of five air outlets O1-O5. Air outlets O in set 21A communicate with a conduit 11A by which air is introduced into fuel system 9A and the air outlets in set 21B communicate with a conduit 11B by which air is introduced into fuel system 9B. Air flowing through conduit 11A enters fuel system 9A at a point above the fuel level in well 63. The effect of varying the quantity of air entering system 9A through the conduit is to modulate, in effect, the vacuum pressure on the fuel and thus vary the quantity of fuel delivered through nozzle 65. Air flowing through conduit 11B enters fuel system 9B between restriction 71 and idle ports 75. Varying the quantity of air entering system 9B through conduit 11B modulates the vacuum pressure at low-speed jet 67 and this controls the quantity of fuel mixed with bleed air. It will be understood that while the same quantity of air may be introduced into fuel systems 9A and 9B through conduits 11A and 11B, the flow rate of air through the respective conduits is dependent upon which carburetor circuit is in use at any one time.

Air metering unit 17 comprises a housing 76 having first and second partitions 28A and 28B respectively dividing it into an inlet chamber 27 which is between a first outlet chamber 22A and a second outlet chamber 22B. Conduit 11A is in communication with outlet chamber 22A and conduit 11B is in communication with outlet chamber 22B. Set 21A of air outlets are in partition 28A and set 21B of air outlets are in partition 28B. The size of the air outlets in each set is determined by the previously stated formula. Thus, as before, outlet O2 in each set is twice the size of outlet O1 of the set and outlet O3 three times the size. Further, outlet O4 is eight times the size of outlet O1 and outlet O5 is sixteen times the size. Each air outlet in set 21B is identical in size to one of the air outlets in set 21A so that outlets O1A and O1B are, for example, the same size as are outlets O2A and O2B etc. With the size of each air outlet as determined by the formula, there is a maximum of thirty-one units of area in each set of air outlets through which air may flow to the respective fuel systems. The total outlet area through which air does flow at any one time is determined by which air outlets in each set are open at that time.

A solenoid valve 77 is provided for corresponding air outlets in the two sets, valve 77A being provided for air outlets O1A and O1B, valve 77B for outlets O2A and O2B, etc. Each valve has a winding 79A–79E respectively in inlet chamber 27 and each valve has a valve member 81 biased to close an air outlet of set 21A and a valve member 83 biased to close an air outlet of set 21B. Valve members 81 and 83 for corresponding air outlets of the first and second sets are coaxially disposed in their associated winding 79 and a spring 85 is positioned in the winding between the valve members to bias each valve member toward its closed position. When electrical current is supplied to a winding 79 of a solenoid valve 77, valve members 81 and 83 of the valve conjointly move to an open position and an air outlet in set 21B is opened simultaneously with the opening of the corresponding air outlet in set 21A.

Referring to FIG. 4, counter control 45 of controller 41 includes a pair of NOR gates G4 and G5 and a NAND gate G6. The delay signal supplied by delay counter 53 is provided to one input of gates G4 and G5 on a line 107. The first and second signal elements of second electrical signal S2 are supplied to a second input of gate G4 on a line 109, while elements of timing signal St are supplied on a line 111 to a second input of gate G5 through a NOR gate G7 (see FIG. 3) which acts as an inverter. The output of gate G5 is connected to one input of gate G6 and the output of gate G6 is connected to the count input of counter 43. Control counter 43 is a five-stage binary counter whose contents may vary between a value of 0 and 31. For a value of 0, all the air outlets in each set are open, while for a value of 31, all the air outlets are closed. For values between these limits, some of the air outlets in each set are open and others are closed and there is a total of 32 possible combinations of open and closed outlets. The logic output from gate G4 is supplied to and up/down input of the counter through an inverter 112 and the logic level supplied to this input determines whether the counter contents are incremented or decremented, the contents being incremented when a logic high is supplied to the input and decremented when a logic low is supplied to the input. Counter 43 has an inhibit output which is connected to a second input of gate G6 for reasons to be discussed.

As previously indicated, a first signal element of delay signal Sd is supplied by delay counter 53 to counter control 45 so long as the value of its contents is less than two. When this signal element (a logic high) is supplied to gate G5, the logic output of the gate is held low and passage of timing signal elements to counter 43 is inhibited. When a second signal element of the delay signal (a logic low) is supplied to gate G5, elements of the timing signal are passed to gate G6. If the value of the contents of control counter 43 is less than 31, when the counter is being incremented, or more than zero when the counter is being decremented, the input signal to gate G6 from the inhibit output of counter 43 is a logic high and timing signal elements are passed to the count input of the counter. As the contents of counter 43 change, the digital signal output of the counter changes.

The digital signal output of counter 43 is supplied on lines 113A–113E to respective driver circuits 115A–115E and each circuit path includes a respective current limiting resistor R18A–R18E. Each driver circuit is comprised of a pair of PNP transistors Q3 and Q4 and a biasing resistor R19. Each stage of the counter output is a logic high or a logic low depending upon the value of the counter contents. If, for example, the value of the contents is twenty-one, a logic low is present at the output stages representing the numbers 1, 4 and 16 and a logic high is present at the output stages representing the numbers 2 and 8. As a result, driver circuits 115B and 115D are actuated and the other driver circuits are not. Current is therefore supplied to solenoid valves 79B and 79D and outlets O2A and O4A in set 21A are open as are outlets O2B and O4B in set 21B. The other outlets in each set are closed and this is the condition shown in FIG. 2.

Operation of the apparatus is as follows:
Assume that the amount of oxygen in exhaust system 15 is increasing, indicating that the air-fuel ratio of the mixture is increasing or that the mixture is getting leaner. For this condition, the amplitude of first electrical signal S1 is decreasing and this amplitude is compared with reference level Vref by comparator 39. If the amplitude of signal S1 is initially greater than the reference level amplitude, it eventually falls below that level as the mixture keeps getting leaner. When the reference level amplitude is passed, a transition T in second electrical signal S2 occurs and the comparator 39 output goes from low to high and a first rather than a second signal element of second electrical signal S2 is produced. This logic high is supplied on line 109 to gate G4 of counter control 45 and to delay counter reset circuitry 55.

The logic high from comparator 39 is inverted to a low by gate G1 and is also supplied through a current limiting resistor R46 and a R-C network comprised of a resistor R47 and a capacitor C14 to one input of gate G3. The other input to gate G3 is the inverted output of comparator 39 which is supplied to the gate through a resistor R48 and a R-C network including a resistor R49 and a capacitor C15. A logic high to either input of gate G3 momentarily forces the gate output low and, as previously discussed, the logic output from gate G3 is supplied to the inverting input of comparator 58. By forcing the logic output of gate G3 momentarily low, comparator 58 is forced to supply a logic high at its output regardless of the level to which capacitor C6 is charged, and this prevents capacitor C6 from discharging since transistor Q2 is kept in its non-conducting state. Thus, the generation of timing signal elements is momentarily inhibited. After a predetermined period established by the time-constant of the R-C networks, the logic output of gate G3 goes high and timing signal elements are again generated. Gate G3 therefore synchronizes the supply of timing signal elements to sampling network 51 and controller 41 with the random occurrence of transitions between signal elements of the second electrical signal.

Delay counter 53 is reset via reset circuitry 55 upon occurrence of the transition, as previously discussed, and a first signal element (a logic high) of delay signal Sd is supplied on line 107 to gates G4 and G5. This high inhibits gate G5 from passing timing signal elements supplied to it on line 111. If the amplitude of signal S1 does not rise above that of reference level Vref prior to two consecutive timing signal elements being supplied to delay counter 53 after it is reset, the counter output changes from a first to a second signal element of the delay signal. Gate G4 now has a logic high and a logic low applied to its inputs and a logic high is supplied to the up/down input of control counter 53 from inverter 112 signifying that the contents of the counter are to be incremented. Gate G5 is now supplied a logic low on line 107 and passes each timing signal element supplied to it. If the value of the contents of counter 43 is less than 31, the input to gate G6 from the count inhibit output of the counter is high and gate G6 passes the timing signal elements to the count input of the counter.

Each timing signal element received by counter 43 at its count input results in the contents of the counter being increased by one. If a logic low were being supplied to the up/down input of the counter, its contents would be decreased by one for each timing signal element received. Each time the contents of counter 43 are incremented, the composition of the digital signal supplied to interface 49 changes. If, for example, the contents of counter 43 previously represented the number twenty-one which, as described, results in the open and closed outlet condition shown in FIG. 2, the contents of the counter changes to represent the number 22 when the first timing signal element is supplied to the count input of the counter. A logic low is now present at the counter output stages representing the numbers 2, 4 and 16 and a logic high is now present at the counter output stages representing the numbers 1 and 8. Driver circuit 115B which was previously actuated, now is not and current is no longer supplied to winding 79B of solenoid valve 77B and outlet 02A in set 21A and outlet 02B in set 21B are closed by movement of valve members 81 and 83 of valve 77B from their open to their closed positions. At the same time, driver circuit 115A is actuated and current is supplied to winding 79A of solenoid valve 77A. Outlets 01A and 01B are simultaneously opened by the movement of valve members 81 and 83 of valve 77A from their closed to their open positions. Outlets 04A and 04B remain open and outlets 03A and 05A in set 21A and outlets 03B and 05B in set 21B remain closed. The total outlet area through which air is introduced into each conduit is reduced by an incremental amount, i.e., from 10 units of area to nine, and less air is therefore introduced through the conduits into respective fuel systems 9A and 9B. More fuel is then drawn into air passageway 5 for mixture with air and the mixture is enriched (the air-fuel ratio decreases).

It will be understood that if the contents of counter 43 are decremented, the reverse of the situation above described would occur. That is, the contents of the counter would represent the number 20 after the first timing signal element was supplied to the count input of the counter and as a result air outlets 01, 02 and 04 in each set would be open and outlets 03 and 05 closed. The total outlet area through which air is introduced into each conduit increases from ten to eleven units and more air is introduced into each fuel system resulting in the air-fuel mixture becoming leaner (the air-fuel ratio increasing). Thus, the quantity of air flowing to both fuel systems is reliably and accurately metered.

The supply of timing signal elements to controller 41 and the resultant changes in the air outlets in sets 21A and 21B that are open and those which are closed continues until the amplitude of first electrical signal S1 crosses reference Ref. This, as described, produces a transition between signal elements of second electrical signal S2 and delay counter reset circuitry 55 responds to the transition to reset delay counter 53 and terminate the supply of a second signal element of the delay signal to counter control 45 and supplies a first signal element instead. This inhibits counter control 45 from supplying any further timing signal elements to control counter 43.

It is important for proper operation of the apparatus that the value of the contents of counter 43 not exceed a maximum value when the counter is being incremented or a minimum value when the counter is being decremented. If, for example, the value of the counter contents is thirty-one and the counter is being incremented, the next timing signal element supplied to the counter results in the capacity of the counter being exceeded and the digital signal from counter 43 represents a 0. As a consequence, the air outlets in each set, all of which are closed for a count value of 31, would all now be opened. More air would be introduced into conduits 11A and 11B and the air-fuel mixture would be leaned. This, however, is the condition trying to be remedied and as a result is only made worse. The reverse is true when the counter is being decremented and the value of its contents reaches zero. To prevent this from happening, counter 43 supplies a logic low to gate G6 whenever one of the two conditions occurs and this inhibits gate G6 from passing timing signal elements to the count input of the counter. This logic low remains until the directon of counting of the counter's contents changes or until an adjustment in the carburetion is made and the value of the counter contents is set to a preset value.

The contents of counter 43 are forced to a preset value whenever power is first applied to the counter. This occurs, for example, when power is first supplied to the apparatus after its installation or when power is first applied to the apparatus after power disruption. An R-C circuit comprised of a capacitor $C_p$ and a resistor $R_p$ produces a momentary logic high at the preset input of the counter and this sets the value of the counter contents to a mid-range value. Setting the contents of counter 43 to the preset value results in the air-fuel ratio being adjusted to a mid-range value. Additionally, voltage from a power source, for example, an automobile battery B, is continuously supplied to the counter when the engine is shut down to maintain the value of the counter contents at the last value attained prior to engine shutdown. This is accomplished, for example, by regulating the battery voltage by a regulator 143 and supplying the regulated voltage output to counter 43 through a clock-fuse circuit generally indicated at 145 which is closed even when engine E is shut down. By maintaining the value of the counter contents at their last attained value, the air-fuel ratio of the mixture has approximately the same value it previously had when the engine is restarted. This helps improve pollution control when the engine is restarted especially when an automobilt in which engine E is placed is driven from one part of the country to another where altitude and other atmospheric conditions have a different effect on the air-fuel ratio than the conditions at the previous location.

Timing unit 47 generates timing signal elements at a first repetition rate when engine E is operating under steady state conditions and at a second and faster repetition rate when a non-steady state condition is created such as when the engine accelerates or decelerates. The operation of timing unit 47 to generate timing signal elements at the first repetition rate which is, for example, 1.5Hz, has been previously described, and involves charging timing capacitor C6 and comparing the charge level of the capacitor with a reference voltage level by comparator 58 and discharging the capacitor when the reference level is reached. When steady state operation of the engine changes, it is reflected, for example, by a change in engine manifold pressure. A switch 165 is positioned in the manifold and is responsive to pressure changes which occur when a non-steady state condition is created to close and remain closed until a new steady state condition is reached.

When a steady state condition exists, a capacitor C18 is charged through a resistor R56. As timing capacitor C6 charges, current flows through a pair of resistors R57 and R58, which form a divider network, and resistor Rc to ground. Current flow through this path has the effect of reducing the charge rate of capacitor C6 by decreasing the capacitor charge current. When a nonsteady state condition is created, a resistor R59 is connected to ground through closed switch 165. The flow of current through the divider network is reversed and this effectively increases the charge current of capacitor C6 so that the capacitor charges at the second and faster rate, which rate is, for example, approximately three times the first rate. This second charge rate continues until switch 165 opens at which time the rate exponentially decays back to the first rate. The decay rate is determined by the values of resistor R56 and capacitor C18. Because discharge of capacitor C6 is controlled by comparator 58, as described, the pulse width of the timing signal elements produced at junction 57 is maintained substantially constant regardless of the charge rate of capacitor C6 or the repetition rate at which the timing signal elements are produced.

The rate at which timing signal elements are generated may also be a function of the state of detector 35 or which signal element of second electrical signal S2 is supplied by comparator 39. Thus, for example, a resistor R60 and a potentiometer 167 may be optionally connected between the input to gate G1 and the non-inverting input of comparator 58. Thus, when the air-fuel mixture is lean, as sensed by detector 35, and a first signal element of the second electrical signal is supplied at the output of comparator 39, current flows through resistor R60 and potentiometer 167 from the comparator and lowers the capacitor C6 charging current and the rate at which timing signal elements are produced. When detector 35 senses a rich mixture and a second signal element of the second electrical signal is supplied at the output of comparator 39, the current flow through resistor R60 and the potentiometer is reversed and the rate at which capacitor C6 is charged increases. Consequently, a bias toward a leaner air-fuel mixture is created since the response of the apparatus is slower when a lean mixture is sensed. By connecting a resistor R60A between the output of inverter gate G1 and potentiometer 167 instead of connecting resistor R60 at the gate input, the opposite result is produced with the bias now toward a richer mixture.

When engine E is not started for some period of time after it is shut down, a cold start condition exists in which the operating temperature of detector 35 is initially less than some preselected value, for example 400° C (752° F). In such a situation, it is desirable not to change the control signal supplied to air metering unit 17 until the detector temperature rises above the preselected value. Since detector 35 has a temperature-dependent internal impedance, circuitry for preventing a change in the control signal comprises a bridge network 169 with the detector impedance included in one leg of the bridge and with another leg of the bridge including an impedance whose value is a function of the detector impedance at the preselected value. One-half of bridge 169 includes the impedance of detector 35, resistor R1 and capacitor C1 and a resistor R61 and a pair of capacitors C19 and C20 respectively. The other half of the bridge comprises a pair of resistors R62 and R63 and the bridge is substantially balanced when the detector temperature is at the preselected value. The bridge output is connected to a comparator 171 (an operational amplifier) which includes a pull-up resistor R64. Comparator 171 supplies first and second signal elements of a bridge output signal to one input of gate G2. A first signal element of the bridge output signal (a logic high) is supplied by comparator 171 when the detector temperature is above the preselected value and a second signal element (a logic low) is supplied when the detector temperature is below the preselected value. When a timing signal element is generated, a pulse is produced by bridge 169 and provided to the non-inverting input of comparator 171. This pulse is a negative going pulse whose amplitude is determined by the internal impedance of detector 35 and compared with the reference voltage at the inverting input to the comparator.

The other input to gate G2 is supplied with elements of an enabling signal. An enabling signal element is produced each time a timing signal element is generated. The circuitry for producing an enabling signal element includes a pair of resistors R65 and R66 respectively, a diode D9 and a capacitor C21. One side of capacitor C21 is connected to the output of inverter G7 which, as previously noted, inverts the timing signal produced at junction 57. Thus, the logic output of gate G7 is normally low but goes high during the period an element of the timing signal is produced. As a consequence, an element of the enabling signal is produced at the trailing edge of a timing signal element and is a momentary high-to-low transition at the input to gate G2.

If a first signal element of the bridge output signal is present at the input to gate G2 when an enabling signal element is supplied to the gate, the logic output of the gate is low. As previously described, the output of gate G2 is connected to delay counter 53 and specifically to the set input of flip-flop FF1 and the reset input of flip-flop FF2. A logic low supplied by gate G2 to counter 53 has no effect on the counter. If, however, a second signal element of the bridge output signal is supplied to gate G2 when an enabling signal element is supplied, it indicates that the temperature of detector 53 is below the threshold level and a logic high is supplied by the gate to counter 53 and the counter is reset. Thus, until the detector temperature exceeds the pedetermined value, counter 53 is reset each time a timing signal element, which normally increments counter 53, is generated. Therefore, the contents of counter 53 cannot reach the value of two which is necessary in order for controller 41 to accept timing signal elements and produce a change in the control signal supplied to air metering unit 17.

Besides not wanting to change the control signal supplied to air metering unit 17 during a cold start, it is also desirable to hold off or prevent a change in the control signal at other times, as for example, durimng heavy accelerations (wide-open throttle). For this purpose, a hold off switch 173 is closed whenever a particular engine operating condition is created during which no change in the control signal is to be produced. When switch 173 is closed, the non-inverting input of comparator 171 is effectively grounded through a circuit which includes resistors R67, R68 and R69 and a capacitor C22. With the non-inverting input of the comparator grounded, a second signal element of the bridge output signal is supplied to gate G2 and results in the gate supplying a logic high to delay counter 53 whenever an enabling signal element is supplied to the gate. Counter 53 is reset by the logic high from gate G2 and continues to be so until switch 173 opens.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for metering the quantity of air supplied to at least two fuel systems in a carburetor for an internal combustion engine, said carburetor having at least one air passageway therein through which air is drawn into the engine, fuel from a source thereof being supplied to said carburetor through said fuel systems and mixed with air as it passes through the carburetor and the carburetor having a first conduit through which air is introduced into a first of said fuel systems and a second conduit through which air is supplied to the second of said fuel systems, the apparatus comprising:

a chamber having an air inlet in communication with said air passageway and a first set of air outlets in communication with said first conduit and a second set of air outlets in communication with said second conduit, each set of air outlets comprising a plurality thereof with the same number of air outlets being in each set and with each of the air outlets in said second set being substantially equal in size to a corresponding one of the air outlets in said first set and said chamber comprising a housing having first and second partitions dividing it into an inlet chamber between a first and a second output chamber, said air inlet being in communication with said inlet chamber, said first conduit being in communication with said first outlet chamber and said second conduit being in communication with said second outlet chamber, said first set of air outlets being in said first partition and said second set of air outlets being in said second partition;

electrically operated valve means for selectively opening and closing each air outlet in each set, the valve means of each air outlet of said first set and the valve means of the corresponding air outlet of said second set being conjointly operable for opening an air outlet of said second set simultaneously with the opening of the corresponding air outlet of said first set and said valve means including a single set of windings in said inlet chamber for each of the corresponding air outlets in the two sets and a valve member for each air outlet of said first set and a valve member for each air outlet of said second set, the valve members for corresponding air outlets in the two sets being operated by one of the windings when it is energized;

means biasing each valve member for an air outlet of said first set and each valve member for an air outlet of said second set toward its closed position closing its associated air outlet; and means for selectively supplying electrical current to each of said windings of said valve means whereby one or more of the corresponding air outlets in said first and second sets are simultaneously opened thereby to supply air from said passageway to said first and second conduits to control the quantity of air flowing to said first and second fuel systems.

2. Apparatus as set forth in claim 1 wherein each of the air outlets in said sets are a different size with the size of the outlets increasing from a small size to a large size in a predetermined progressive manner.

3. Apparatus as set forth in claim 2 wherein there are $n$ air outlets in each set and the size of any air outlet is determined by the formula $O_x = O_1 \cdot 2^{x-1}$, where $O_x$ is an outlet whose size is to be determined, $O_1$ is the size of the smallest outlet in each set and $x$ is a positive integer having a value between 1 and $n$.

4. Apparatus as set forth in claim 2 wherein the valve means comprises a plurality of solenoid valves, one for each of the corresponding air outlets in the two sets.

5. Apparatus as set forth in claim 4 wherein a valve member for an air outlet of said first set and a valve member for a corresponding air outlet of said second set are coaxially disposed in their associated winding and a spring is positioned in said winding between said valve members to bias each valve member toward its respective closed position.

6. In a carburetor for an internal combustion engine, said carburetor having at least one air passageway therein through which air is drawn into the engine, first and second fuel systems through which fuel is delivered from a source thereof to the air passageway, a first conduit through which air is introduced into said first fuel system and a second conduit through which air is introduced into said second fuel system, the improvement comprising:

means defining a chamber having an air inlet in communication with said air passageway, said means including a housing having first and second partitions dividing it into an inlet chamber between a first and a second outlet chamber, said air inlet being in communication with said inlet chamber, said first conduit being in communication with said first outlet chamber and said second conduit being in communication with said second outlet chamber and at least one air outlet in said first partition communicating with said first conduit and at least one air outlet in said second partition communicating with said second conduit;

electrically operated valve means for simultaneously opening and closing said air outlets; and means for supplying electrical current to said valve means thereby to open said outlets and supply air from said air passageway to said first and second fuel systems.

7. The improvement as set forth in claim 6 wherein said chamber defining means further includes a plurality of air outlets in said first partition and a plurality of air outlets in said second partition, each plurality of air outlets comprising a set thereof with each air outlet in each set being a different size and the size of the outlets in each set increasing from a small size to a large size in a predetermined progressive manner.

8. The improvement as set forth in claim 7 wherein there are the same number of air outlets in each set and each air outlet in one of the sets is substantially identical in size to a corresponding one of the air outlets in the other set.

9. The improvement as set forth in claim 8 wherein the valve means comprises a plurality of solenoid actuated valves one for each of the corresponding air outlets in the two sets and the current supplying means includes means for selectively supplying electrical current to each of the solenoid actuated valves whereby one or more of the corresponding air outlets in the two sets may be simultaneously opened.

10. The improvement as set forth in claim 9 wherein each solenoid actuated valve comprises a single set of windings in said inlet chamber and a valve member for an air outlet in said one set and a valve member for the corresponding air outlet in said other set, the valve members for corresponding air outlets in the two sets being operated by their associated winding when it is energized.

11. The improvement as set forth in claim 10 wherein the valve members for corresponding air outlets in the two sets are axially disposed in their associated winding and a spring is positioned in said winding between said valve members to bias each valve member to close its associated air outlet.

* * * * *